United States Patent
Zolfaghari

(10) Patent No.: US 8,126,415 B2
(45) Date of Patent: Feb. 28, 2012

(54) METHOD AND SYSTEM FOR CLOCK SYNCHRONIZATION IN A GLOBAL NAVIGATION SATELLITE SYSTEM (GNSS) RECEIVER

(75) Inventor: Alireza Zolfaghari, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 741 days.

(21) Appl. No.: 12/192,980

(22) Filed: Aug. 15, 2008

(65) Prior Publication Data

US 2009/0315771 A1 Dec. 24, 2009

Related U.S. Application Data

(60) Provisional application No. 61/073,952, filed on Jun. 19, 2008.

(51) Int. Cl.
*H04B 1/06* (2006.01)
*H04K 3/00* (2006.01)

(52) U.S. Cl. ..................... 455/265; 455/343.1
(58) Field of Classification Search .......... 455/255–260, 455/265, 343.1
See application file for complete search history.

(56) References Cited

U.S. PATENT DOCUMENTS

| | | | |
|---|---|---|---|
| 5,526,391 A | 6/1996 | Shankar et al. | |
| 5,629,708 A | 5/1997 | Rodal et al. | |
| 6,856,794 B1 | 2/2005 | Tso et al. | |
| 7,053,826 B1 * | 5/2006 | McBurney et al. | 342/357.64 |
| 2004/0209625 A1 | 10/2004 | Haddrell | |
| 2005/0212699 A1 | 9/2005 | Horslund et al. | |
| 2006/0149984 A1 | 7/2006 | Yasumoto | |

FOREIGN PATENT DOCUMENTS

EP 1 715 358 10/2006

OTHER PUBLICATIONS

European Search Report corresponding to European Patent Application No. 09007636.5-2220, dated Feb. 14, 2011.
European Search Report corresponding to European Patent Application No. 09007636.5-2220, dated Nov. 9, 2009.

* cited by examiner

*Primary Examiner* — Lee Nguyen
(74) *Attorney, Agent, or Firm* — Thomas, Kayden, Horstemeyer & Risley, LLP

(57) ABSTRACT

Aspects of a method and system for clock synchronization in a GNSS receiver are provided. In this regard, generation of a clock signal in a GNSS receiver may be disabled during a first time interval and enabled during a second time interval, wherein a counter utilized to generate the clock signal may be initialized to a known value during the first time interval via a reset signal synchronized to a reference signal. The reference signal may be generated by a temperature compensated crystal oscillator. Additionally, a counter may be incremented on each active edge of the reference signal that occurs during the first time interval and the value stored in the timer may be utilized to correct time in the GNSS receiver after the first time interval. In this regard, the value stored in the timer may be added to the time at which the first interval began.

24 Claims, 7 Drawing Sheets

METHOD AND SYSTEM FOR CLOCK SYNCHRONIZATION IN A GLOBAL NAVIGATION SATELLITE SYSTEM (GNSS) RECEIVER

CROSS-REFERENCE TO RELATED APPLICATIONS/INCORPORATION BY REFERENCE

This patent application makes reference to, claims priority to and claims benefit from U.S. Provisional Patent Application Ser. No. 61/073,952 filed on Jun. 19, 2008.

The above stated patent application is hereby incorporated herein by reference in its entirety.

FIELD OF THE INVENTION

Certain embodiments of the invention relate to signal processing. More specifically, certain embodiments of the invention relate to a method and system for clock synchronization in a GNSS receiver.

BACKGROUND OF THE INVENTION

Global navigation satellite systems (GNSS) receivers may normally determine their position by receiving satellite broadcast signals from a plurality of satellites. These satellites, for example 24 at any time for the Global Positioning System (GPS), may broadcast radio frequency signals that comprise information that may be exploited by the satellite receiver to determine its own position. By measuring the time the broadcast signals may travel from the satellites to the satellite receiver, and the known position of the transmitting satellite, the satellite receiver may be able to determine its own position by trilateration. In general, at least 3 satellite signals may need to be decoded at the satellite receiver in order to determine its position. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided clock synchronization in a GNSS receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for clock synchronization in a GNSS receiver. In this regard, generation of a clock signal in a GNSS receiver may be disabled during a first time interval and enabled during a second time interval wherein a counter utilized to generate the clock signal may be initialized to a known value during the first time interval via a reset signal synchronized to a reference signal. The reference signal may be generated by a temperature compensated crystal oscillator. Additionally, a counter may be incremented on each active edge of the reference signal that occurs during the first time interval and the value stored in the timer may be utilized to correct time in the GNSS receiver after the first time interval. In this regard, the value stored in the timer may be added to the time at which the first interval began. Power consumption of the GNSS receiver may be reduced by powering down one or more portions of the GNSS receiver during the first time interval, wherein the one or more portions may comprise a clock generator. In various embodiments of the invention, the clock generator utilized to generate the clock signal may comprise a PLL and a frequency divider. The PLL may generate the LO signal based on the reference signal and the frequency divider may divide the LO signal to generate the clock signal. The frequency divider may comprise a counter which may be initialized to a known value when the reset signal is asserted. The reset signal may be asserted at time on the active edge of the reference signal that begins the first time interval. The reset signal may be de-asserted at time on an active edge of the reference signal that corresponds to a transition between the first time interval and the second time interval.

Figure 1A:
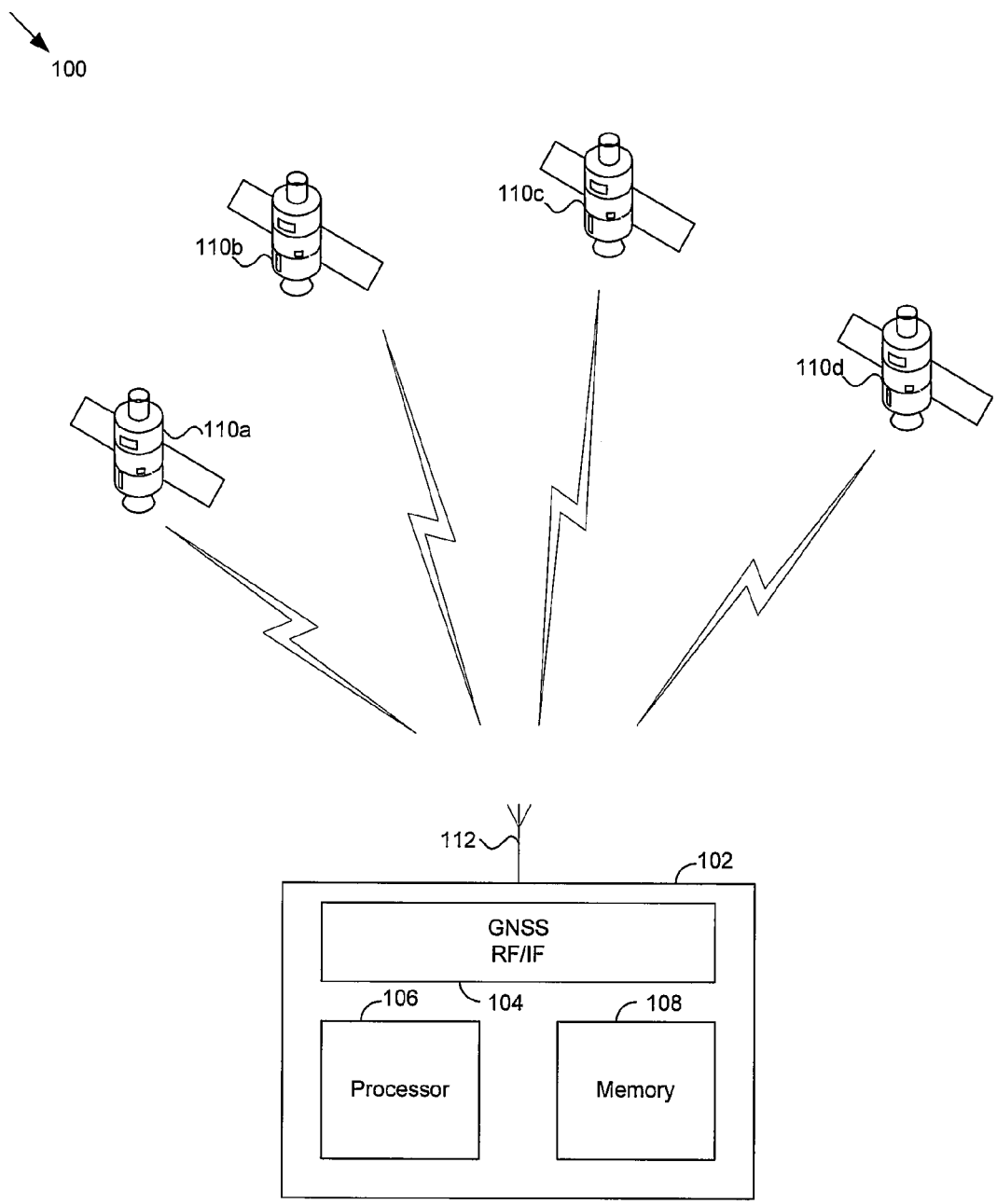
FIG. 1A is a diagram illustrating an exemplary satellite navigation system, in accordance with an embodiment of the invention.

FIG. 1 is a diagram illustrating an exemplary satellite navigation system, in accordance with an embodiment of the invention. Referring to FIG. 1, there is shown a satellite navigation system 100, comprising a satellite receiver 102 and a plurality of satellites, of which satellites 110a, 110b, 110c, 110d may be illustrated. The satellite receiver 102 may be communicatively coupled to a receiver antenna 112. The satellite receiver 102 may comprise a Global Navigation Satellite System (GNSS) radio-frequency (RF) and intermediate-frequency (IF) front-end 104, a processor 106 and memory 108.

The satellites 110a through 110d may comprise suitable logic, circuitry and/or code that may be enabled to generate and broadcast suitable radio-frequency signals that may be received by a satellite receiver, for example satellite receiver 102, to determine the satellite receiver 102 position.

The satellite receiver 102 may comprise suitable logic, circuitry and/or code that may be enabled to receive signals broadcasted from satellites, for example satellites 110a through 110d, and process the received signals to determine the position of the satellite receiver 102. The GNSS RF/IF front-end 104 may comprise suitable logic, circuitry and/or code that may be enabled to receive satellite broadcast signals via receiver antenna 112 and process them in a desirable fashion to generate baseband signals, which may be suitable for further processing in the satellite receiver 102 and the processor 106. For example, the GNSS RF/IF front-end 104 may be enabled to generate one or more clock signals which may be utilized to process received GNSS signals. In this regard, the clock signals generated in the GNSS RF/IF front-end 104 may be communicatively coupled to the processor 106 and/or the memory 108 and may be utilized for generating and/or tracking time in the receiver 102. The memory 108 may comprise suitable logic, circuitry and/or code that may enable storage and access to data and code suitable for the operations performed by the satellite receiver 102 and the processor 106.

In FIG. 1, an exemplary satellite navigation scenario may be illustrated, wherein a satellite receiver 102 may receive a plurality of satellite signals from which the satellite receiver 102 may be able to extract information that may enable the satellite receiver to determine its position. The satellite receiver 102 and the satellites, for example satellites 110a through 110d, may be operating in compliance with the Global Positioning System (GPS) developed and operated by the United States of America Department of Defense. In accordance with various embodiments of the invention, the invention may not be limited to application in GPS and may be applied to other GNSS systems, for example GALILEO, GLONASS, IRNSS, and BEIDOU.

In operation, power consumption of the receiver 102 may be reduced by periodically powering down portions of the receiver 102. However, to quickly and accurately determine position, a time, $t_r$, may be maintained in the receiver 102 and $t_r$ may be synchronized with, or otherwise have a fixed relationship to, a time $t_s$ maintained in the satellites 110. Thus, aspects of the invention may enable maintaining accuracy of the time $t_r$ with respect to satellite time $t_s$ when portions of the receiver 102 may be periodically powered down.

Figure 1B:
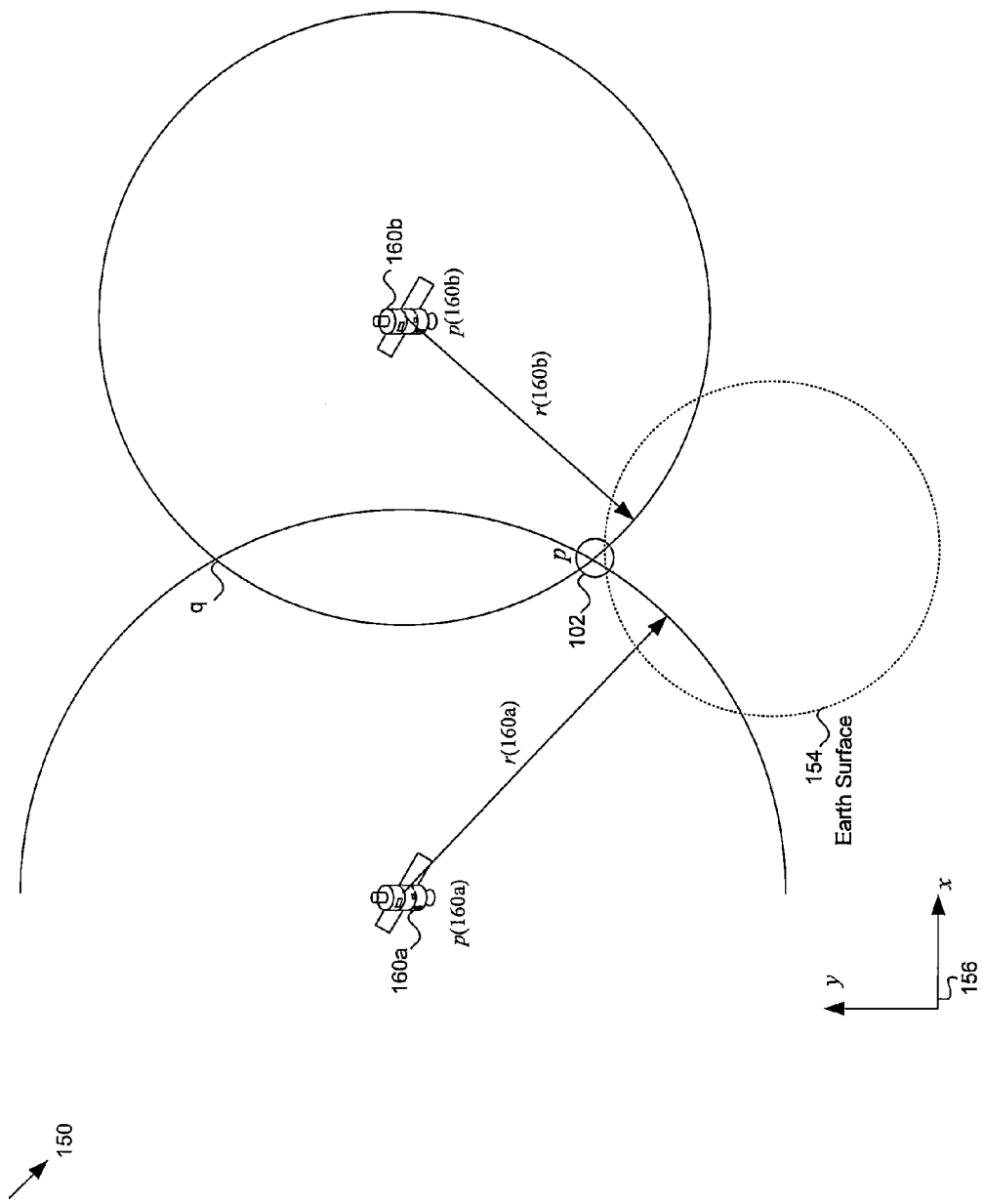
FIG. 1B is a diagram illustrating an exemplary satellite navigation system in a two-dimensional setting, in accordance with an embodiment of the invention.

FIG. 1B is a diagram illustrating an exemplary satellite navigation system in a two-dimensional setting, in accordance with an embodiment of the invention. Referring to FIG. 1B, there is shown a satellite navigation system 150, comprising a receiver 102 (illustrated by a small circle) at position p, satellites 160a and 160b, an earth surface 154 illustrated by a dotted circle, and an exemplary two-dimensional coordinate system 156. There is also shown a position of satellite 160a denoted p(160a), a position of satellite 160b denoted p(160b), an intersection point q, a range from satellite 160a to the satellite receiver 102 r(160a) and a range from satellite 160b to the satellite receiver 102 r(160b).

To illustrate the principles involved in determining a position of the receiver 102 from the satellites, for example the satellites 160a and 160b, it may be useful to consider a two-dimensional scenario as illustrated in FIG. 1B. The three-dimensional case encountered in reality may be considered an extension to three dimensions of the principles demonstrated in the two-dimensional case. As illustrated in FIG. 1B, the principle of determining the position p of the satellite receiver 102 may be to measure the range from the satellite receiver 102 to a plurality of satellites, for example r(160a) and r(160b), based on the known positions of the satellites, for example p(160a), and p(160b). Based on the measured ranges from the satellites 160a and 160b to the satellite receiver 102 and the known position of the satellites, each satellite may define a circle of positions that lie at a given range from the satellite, as illustrated in FIG. 1B. In the case of two satellites, there may be two intersection points: one may be the desired position p and the other may be the intersection q. As may be observed from FIG. 1B, only p may be close to the surface of the earth. Hence, only p may be a feasible solution for the position of the satellite receiver 102. Therefore, in the depicted two-dimensional scenario of FIG. 1B, two satellites may suffice in principle to determine the position p. The position p may be given by one solution to the following relationships in the two-dimensional case:

$$r(k)=\|p(k)-p\|, k=210a,210b \qquad \text{EQ. 1}$$

In three dimensions, the circles around the satellites may become spheres and the intersection of two spheres may generate a circle of feasible solutions. By intersecting the circle with a further sphere, two possible positions will be found. Again, only one of the two solutions will be close to the surface of the earth. Therefore, in the three dimensional case, the solution may require 1 more satellite to resolve the extra dimension and the position may be resolved from the following relationship, where each k may denote a different satellite:

$$r(k)=\|p(k)-p\|, k=1,2,3 \qquad \text{EQ. 2}$$

Each satellite, for example satellites 160a and 160b, may broadcast a signal that may comprise information to determine the satellite's position. Once placed in orbit, a satellite's position may be predictable. This predicted position of the satellites may generally be available in an almanac at the satellite receiver and may be stored, for example, in the memory 108. Due to certain imperfections in computing the satellite's position, a GPS ground station may monitor the satellite's exact position. In order to correct for any deviations from the almanac position, the ground station may supply the satellite with data that may allow the satellite's position to be determined to a high degree of accuracy when received by a satellite receiver. This data may be valid for a limited time only and may be referred to as ephemeris data. Its ephemeris data may be broadcast by each satellite, and may be received by the satellite receiver. The satellite position p(k,t) of satellite k, may be computed using the ephemeris data. The almanac position P(k,t) of a given satellite k may hence be related to the position p(k,t) together with a correction term $\Delta(k,t)$ from the following relationship:

$$p(k,t)=P(k,t)+\Delta(k,t) \qquad \text{EQ. 3}$$

where the variable t may denote time and indicate that the position of the satellite may change as a function of time. In instances that the correction term $\Delta(k,t)$ may be available at a satellite receiver, for example satellite receiver 102, the exact position of the satellite k may be determined to a high degree of accuracy.

The range r(k) may be determined from measuring the time it may take for the transmission to travel from the satellite, for example satellite 160a, to the satellite receiver 102. Ideally, the clocks of the satellite 160a and the satellite receiver 102 may be synchronized and the travel time $\tau(k)$ may be determined. In this regard, a signal may be transmitted at absolute time $t_1$ which may correspond to satellite time $t_{s1}$ and may be received at the receiver 102 at absolute time $t_4$, which may correspond to receiver time $t_{r4}$. In this manner, in instances that receiver time, $t_r$, may be accurately maintained, the calculated travel time, $\tau_c$, may be equal to the actual travel time, $\tau_A$:

$$\tau_C=t_{r4}-t_{s1}=t_4-t_1=\tau_A \qquad \text{EQ. 4}$$

However, in instances that receiver time, $t_r$, may not be accurately maintained, such as when the receiver may be powered down, the calculated time, $\tau_c$, may be different from the actual travel time, $\tau_A$, resulting in errors in determining position. For example, receiver 102 may be powered down at absolute time $t_2$ and powered back up at absolute time $t_3$ and may not track time during the time interval $t_2$ to $t_3$, where $t_1 < t_2 < t_3 < t_4$. Thus, since receiver time has advanced by one amount:

$$t_{r4} - t_{r1} = (t_4 - t_1) - (t_3 - t_2), \qquad \text{EQ. 5}$$

while satellite time has advanced by a different amount:

$$t_{s4} - t_{s1} = t_4 - t_1, \qquad \text{EQ. 6}$$

the calculated time, $\tau_c$, may be incorrectly calculated as:

$$\tau_c = t_{r4} - t_{s1} = (t_2 + (t_4 - t_3)) - t_1 = (t_4 - t_1) - (t_3 - t_2) \ne \tau_A \qquad \text{EQ. 7}$$

Accordingly, aspects of the invention may enable maintaining accurate time in the receiver 102 such that the travel time may be accurately calculated by the receiver 102 when portions of the receiver 102 may have been powered down for a portion of the travel time.

Figure 2:
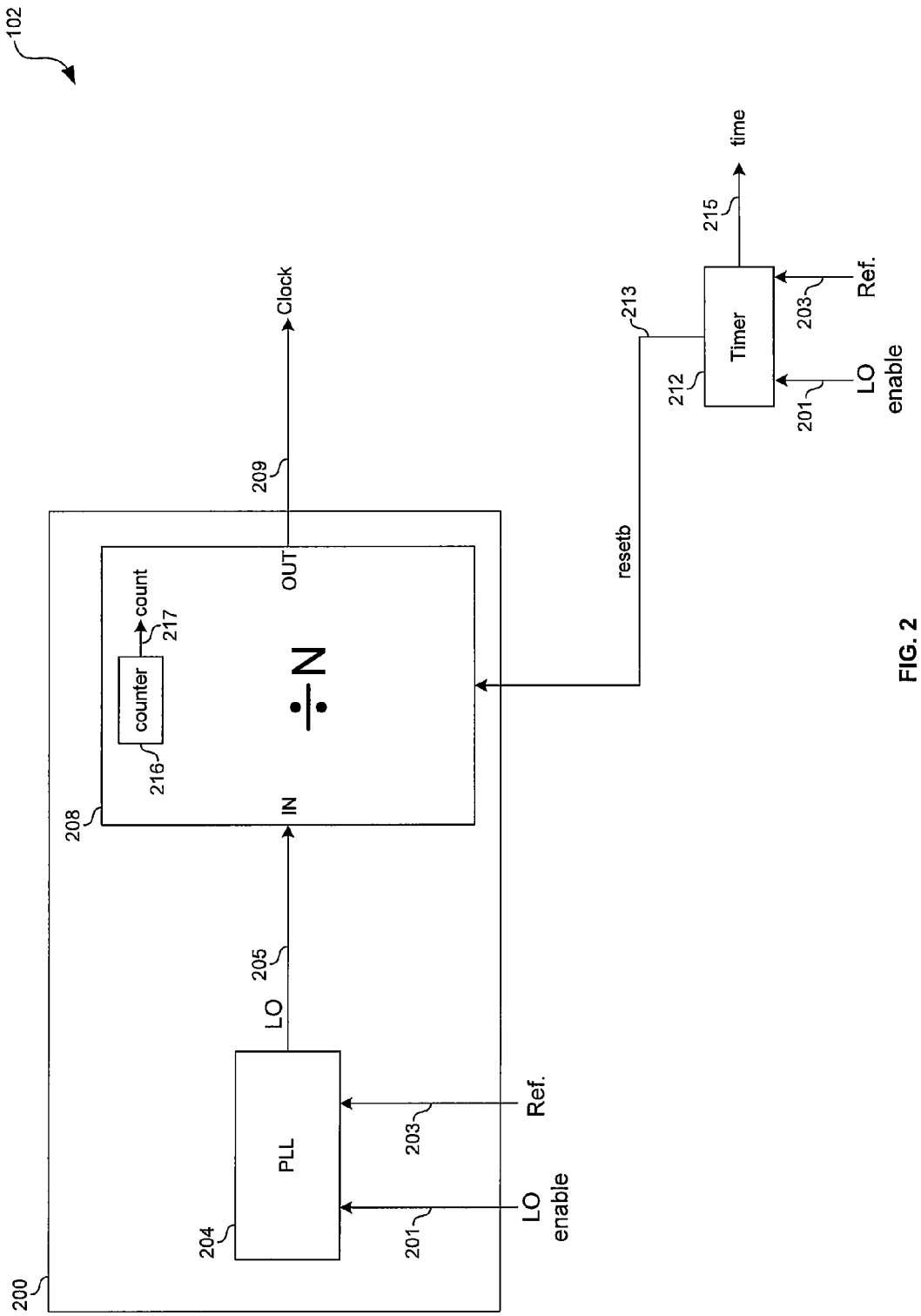
FIG. 2 is a diagram of a portion of a GNSS receiver, in accordance with an embodiment of the invention.

FIG. 2 is a diagram of a portion of a GNSS receiver, in accordance with an embodiment of the invention. Referring to FIG. 2 there is shown a clock generator 200 and a timer 212.

The clock generator 200 may comprise suitable logic, circuitry, and/or code that may be operable to generate a digital clock signal 209 based on a reference signal 203. In various embodiments of the invention, the clock generator 200 may be implemented in the GNSS RF/IF front-end 104. In an exemplary embodiment of the invention, the clock generator 200 may comprise a PLL 204 and a frequency divider 208. Processing of GNSS signals and calculation of position of the receiver 102 may be based on the clock signal 209. In this regard, during normal operation, the clock signal 209 may enable maintaining accurate receiver time.

The PLL 204 may comprise suitable logic, circuitry, and/or code that may enable generating a local oscillator (LO) signal 205 based on a reference signal 203. In an exemplary embodiment of the invention, a temperature compensated crystal oscillator (TCXO) may provide the reference signal 203 to the PLL 204. Additionally, operation of the PLL 204 may depend on an LO enable signal 201. The LO enable signal 201 may be a power supply to the clock generator 200 or may be a digital signal corresponding to a state of the power supply to the clock generator 200. For example, when the LO enable signal 204 is low, the clock generator 200 may be in a low(er) power state and generation of the LO signal 205 and the clock signal 209 may be disabled. Alternatively, when the LO enable signal 204 is high, the clock generator 200 may be powered up and the PLL 204 may generate the LO signal 205 and the divider 208 may generate the clock signal 209.

The frequency divider 208 may comprise suitable logic, circuitry, and/or code that may enable outputting the clock signal 209 which may differ from the input LO signal 205 by the factor '1/N', where 'N' may be an integer or a fraction greater than 0. In various embodiments of the invention, the divider 208 may comprise one or more counters 216. In this regard, each time a programmed value may be reached, the clock 209 may be toggled and the counter 216 may be reset to 0. For example, the divider 208 may comprise a 4-bit counter and may toggle on alternating counts of 'L' reference signal cycles and 'M' reference signal cycles. In this regard, 'N' may be determined by 'L+M' and the duty cycle of the clock signal 209 may be 'M/N'. The frequency divider may buffer and/or latch the resetb signal 213. In this manner, reset and/or initialization of the counter 216 and/or other portions of the divider 208 may be synchronized to the LO signal 205.

The timer 212 may comprise suitable logic, circuitry, and/or code that may enable tracking time. In an exemplary embodiment of the invention, the timer 212 may be an up-counter and may be implemented in the processor 106 and/or the memory 108. The timer 212 may also comprise suitable logic, circuitry, and/or code that may enable generating a reset signal, resetb 213, which may be synchronized with an active edge of the reference signal 203.

In operation, the clock generator 200 may be periodically powered down to reduce power consumption in the GNSS receiver 102. However, the clock 209 may be utilized for tracking time in the GNSS receiver 102. Various aspects of the invention may enable keeping track of time by clocking the timer 112 with the reference signal 203 while the clock signal 209 may be absent. Accordingly, subsequent to a time interval during which the clock 209 may have been absent, the value of the timer 112 may be utilized to correct the receiver time $t_r$. In this regard, the timer 112 may enable maintaining synchronization and/or a fixed timing relationship between the receiver 102 and a satellite such as the satellites 160 of FIG. 1B.

For example, at receiver time $t_{ra}$, corresponding to absolute time $t_2$, the LO enable signal 201 may be de-asserted and a value stored in the timer 212 may increment (or decrement in the case of a down-counter) on each active edge of the reference signal 203. Subsequently, at receiver time $t_{rb}$, corresponding to absolute time $t_3$, the LO enable signal 201 may be re-asserted. In this regard, if time was not tracked during the interval $t_2$ to $t_3$, then upon powering up the clock generator 200, the receiver time $t_{rb}$ may still be equal to $t_{ra} = t_2$. Accordingly, a value of the timer 212 just prior to re-assertion of the LO enable signal 201 may be utilized to correct the receiver time, such that trb =t3 (within a tolerance).

In this regard, when the clock 209 returns, the processor 108 may fetch the value from the timer 212 and may correct the receiver time to restore synchronization and/or a fixed relationship to (within a tolerance) satellite time. However, the length of time between the last increment of the timer 212 and the first active edge of the clock 209 may vary and thus lead to error in the correction of the receiver time. In this regard, the length of time between the last increment of the timer 212 and the first active edge of the clock 209 may vary because the value of the counter 216 may be random and unknown at the time LO enable was de-asserted. For example, for a first re-assertion of the LO enable signal 201, the counter 216 may be equal to zero and for a second re-assertion of the LO enable signal 201 the counter 216 may be equal to 'L'. Consequently, the clock 209 may toggle after 'L' LO 205 cycles in the first case and one LO 205 cycle in the second case. Thus, the variance between the last increment of the timer 212 and the first active edge of the clock 209 may be from one to 'L' (or 'M') cycles of the LO signal 205. Accordingly, aspects of the invention may enable resetting the counter 216 at or near a time when the LO enable signal 201 may be de-asserted such that the length of time between the last increment of the timer 212 and the first active edge of the clock 209 may be determined within one period of the LO signal 205.

Figure 3A:
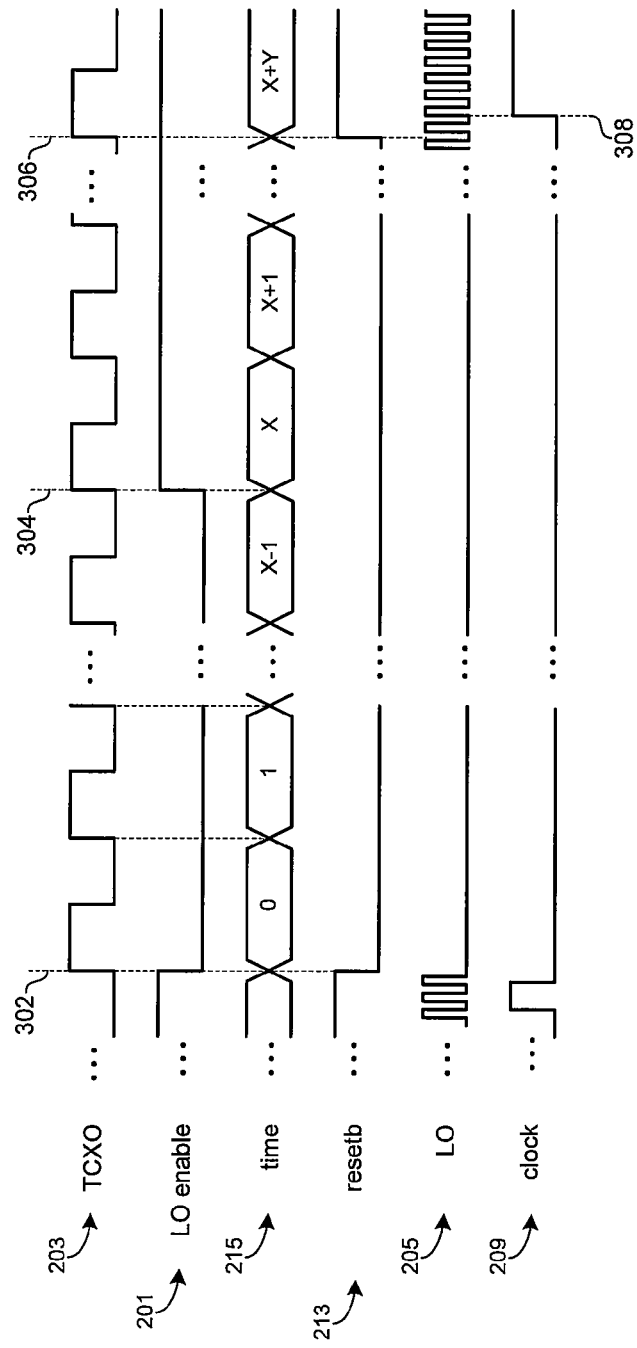
FIG. 3A is a timing diagram illustrating maintaining time in a GNSS receiver, in accordance with an embodiment of the invention.

FIG. 3A is a timing diagram illustrating maintaining time in a GNSS receiver, in accordance with an embodiment of the invention. Referring to FIG. 3A there is shown exemplary waveforms for the reference signal 203, the LO enable signal 201, the time signal 215, the resetb signal 213, the LO signal 205, and the clock signal 209.

At time 302, synchronous with an active edge of the reference signal 203, generation of the clock signal 209 may be disabled by de-asserting LO enable 201 and asserting resetb 213. Additionally, the receiver time $t_{r302}$ just prior to time 302 may be retained, for example, by storing it in the memory 108. From time 302 to time 306, the receiver 102 may be in a low(er) power mode and the clock generator 200 may be disabled. From time 302 to time 304, the count 215 may be incremented on each active edge of the reference signal 203. In this regard, LO enable 201 may be de-asserted for 'X' cycles of the references signal 203. In various embodiments of the invention, actives edge may be positive or negative edges.

At time 304, LO enable 201 may be re-asserted and the PLL 204 may begin generating the LO signal 205. However, because it may take some time for the PLL 204 to achieve phase lock and for the LO signal 205 to stabilize, resetb 213 may be asserted for an additional 'Y' cycles of the reference signal 203.

At time 306, 'X+Y' cycles of the reference signal 203 after time 302, the LO signal 205 may be stable, resetb 213 may be de-asserted, and generation of the clock signal 209 may be re-enabled on an active edge of the LO signal 205.

Subsequently, at time 308, on an active edge of the LO signal 305, the clock signal 209 may be toggled. Upon return of the clock signal 209, the receiver time, $t_r$, may be corrected to restore synchronization and/or a fixed relationship to (within a tolerance) satellite time. In this regard, the receiver time may be adjusted as follows:

$$t_{r308} = t_{r302} + (X+Y)*T_{203} \quad \text{EQ. 8}$$

where $t_{r\,308}$ may be the corrected receiver time just after time 308, $t_{r302}$ may be the receiver time just prior to de-assertion of the LO enable signal 201 at time 302, 'X' may be the number of cycles of the reference signal 203 that LO enable was de-asserted 'Y' may be number of cycles of the reference clock 203 allowed for the LO signal 205 to stabilize, and $T_{203}$ may be the period of the reference signal 203.

Figure 3B:
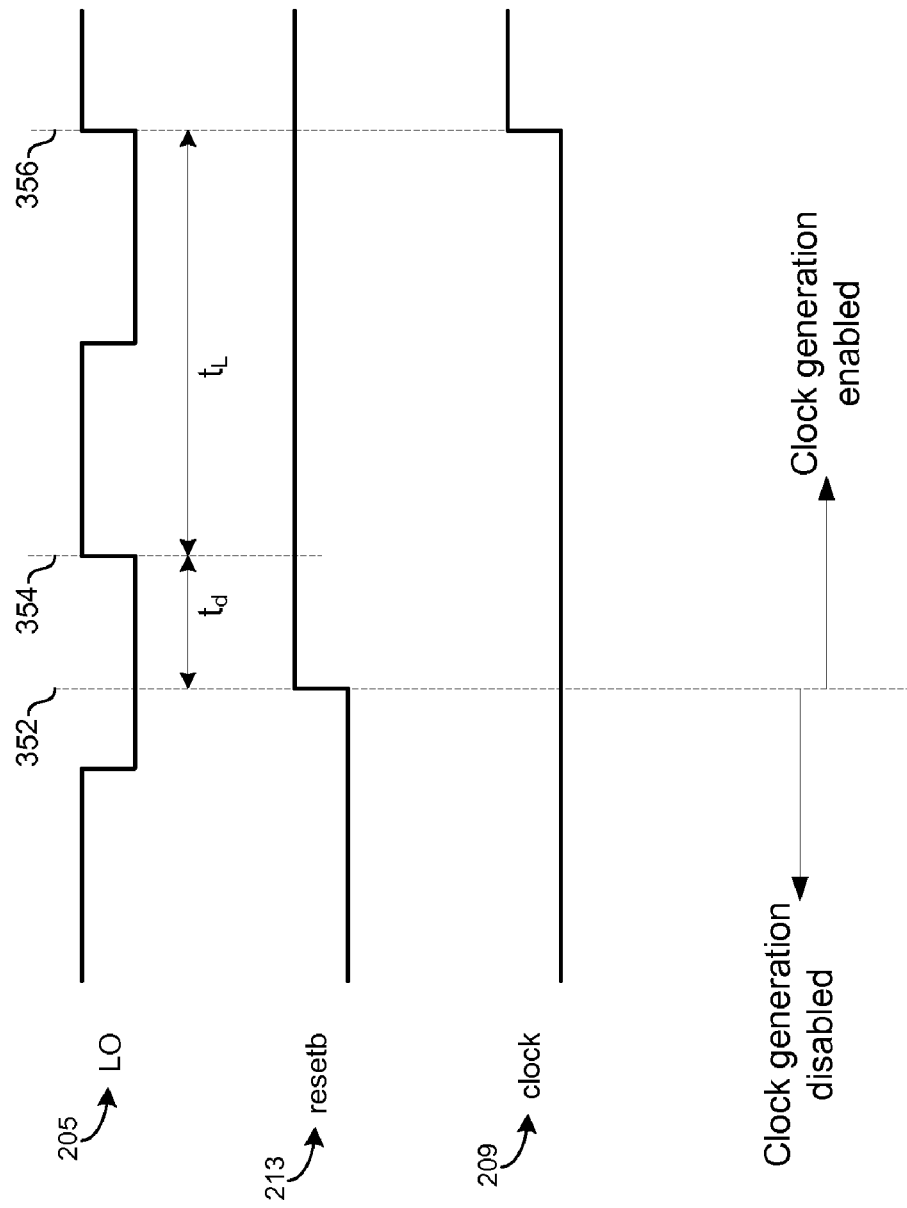
FIG. 3B is a timing diagram illustrating the initialization of a clock generator in a GNSS receiver, in accordance with an embodiment of the invention.

FIG. 3B is a timing diagram illustrating the initialization of a clock generator in a GNSS receiver, in accordance with an embodiment of the invention. Referring to FIG. 3B there is shown exemplary waveforms for the signal LO 205, resetb 213, and clock 209.

At time instant 352, synchronous with an active edge of the reference signal 203 (not shown in FIG. 3B), resetb 213 may be de-asserted and generation of the clock signal 209 may be enabled. There may be a delay $t_d$ from time 352 until an active edge of the LO signal 205 at time 354. In this regard, $t_d$ may result from trace resistance and/or propagation/buffering delays in the frequency divider 208. Additionally, the LO signal 205 and the reference signal 203 may not be synchronized, and thus $t_d$ may result from a random delay from 0 to $T_{LO}$ between de-assertion of resetb 213 and an active edge of LO 205, where $T_{LO}$ is the period of the LO signal 205. In this regard, $t_d$ may be variable and/or unknown and thus may result in an error between receiver time and satellite time. However, because $t_d$ may be less than one period of the LO signal 205, the error in a position calculation resulting from td may be insignificant.

At time instant 354, on the first active edge of the LO signal 205 subsequent to de-assertion of the signal resetb 213, resetb 213 may be latched and/or detected by the frequency divider 208.

At time instant 356, on an active edge of the LO signal 205, the clock signal 209 may be toggled. In this regard, there may be some latency, $t_L$, from detection and/or latching of the resetb signal 213 by the frequency divider 208 until assertion of the clock signal 209. However, since $t_L$, is fixed at one period of the LO signal 205, it may be accounted for when correcting time in the receiver 102. For example, $t_L$, may be added to the receiver time $t_{302}$ calculated in EQ. 8 as follows:

$$t_{r308} = t_{r302} + (X+Y)*T_{203} + T_{205} \quad \text{EQ. 9}$$

where $T_{205}$ is the period of the LO signal 205.

Figure 3C:
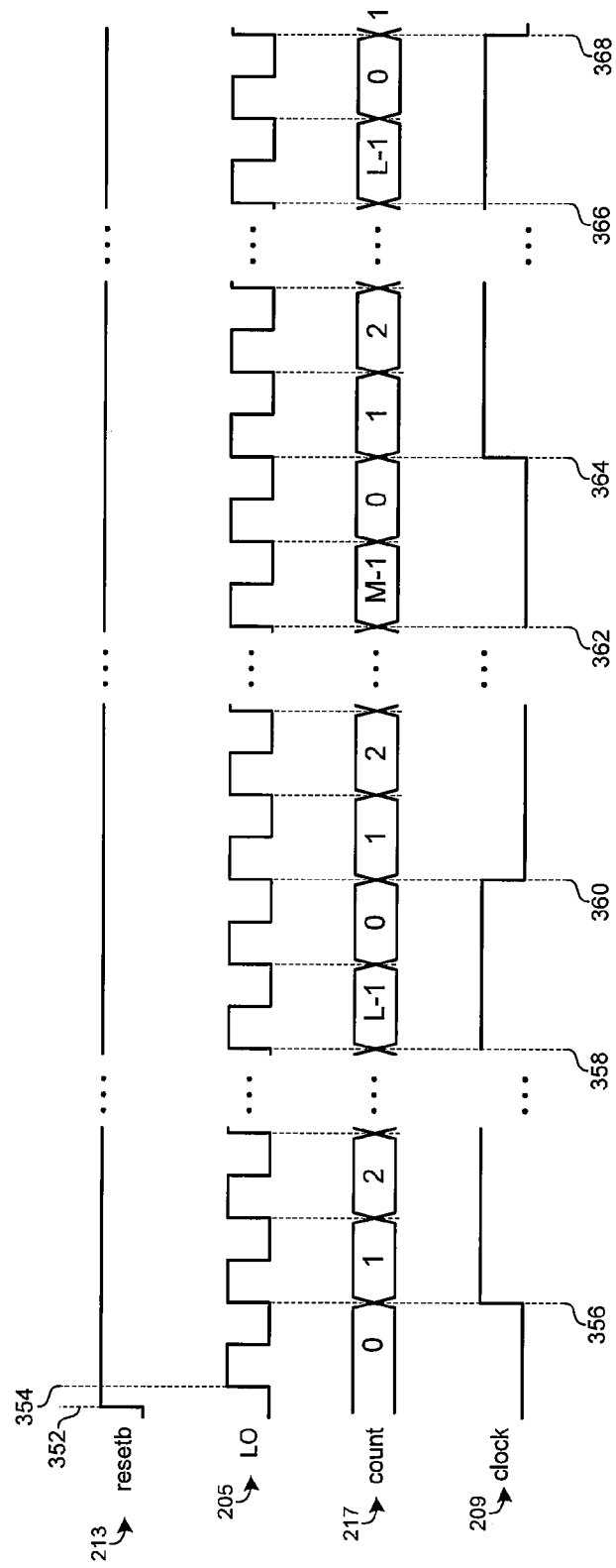
FIG. 3C illustrates generation of a clock signal in a GNSS receiver, in accordance with an embodiment of the invention.

FIG. 3C illustrates generation of a clock signal in a GNSS receiver, in accordance with an embodiment of the invention. Referring to FIG. 3C there is shown exemplary waveforms for resetb 213, LO 205, count 217, and clock 209.

A frequency and a duty cycle of the clock signal 209 may be controlled via the variables L and M, which may, for example, be pre-programmed by system designers or determined by the processor 106.

At time instant 352, resetb 213 may be de-asserted; thus enabling generation of the clock signal 209. Subsequently, at time instant 356, on the second active edge of the LO signal 205, the clock signal 209 may be toggled. From time 356 to time 358, the count 217 may be incremented on each active edge of the LO signal 205. At time instant 358, the value of the count 217 may become 'L-1', where L may the number of cycles of the LO signal 205 that the clock 209 may be asserted. Consequently, on the next active edge of the LO signal 205, the count 217 may be reset to 0. At time 360, the count 217 value of 0 may cause the clock 209 to toggle.

From time instant 360 to time instant 362, the count 217 may be incremented on each active edge of the LO signal 205. At time instant 362, the value of the count 217 may become 'M-1', where M may be the number of cycles of the LO signal 205 that the clock 209 may be de-asserted. Consequently, on the next active edge of the LO signal 205, the count 217 may be reset to 0. At time instant 364, the count 217 value of 0 may cause the clock 209 to toggle. The clock signal 209 may continue to be generated in this fashion as long as resetb 213 remains de-asserted.

Figure 4:
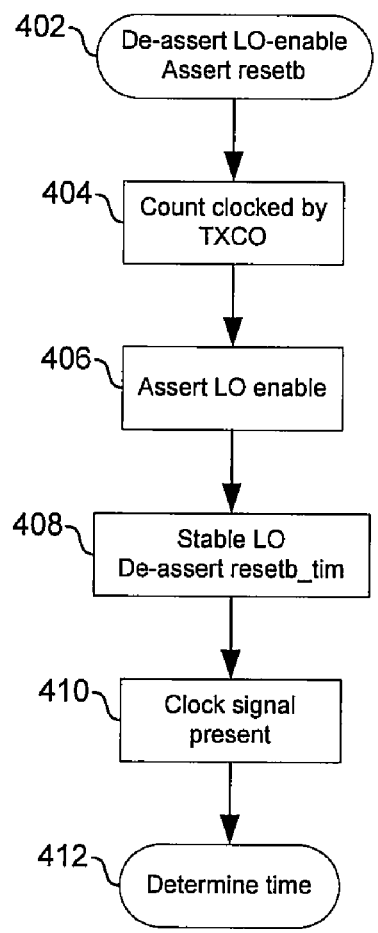
FIG. 4 is a flow chart illustrating exemplary steps for maintaining time in a GNSS receiver in instances portions of the GNSS receiver may be periodically powered down, in accordance with an embodiment of the invention.

FIG. 4 is a flow chart illustrating exemplary steps for maintaining time in a GNSS receiver in instances that portions of the GNSS receiver may be periodically powered down, in accordance with an embodiment of the invention. Referring to FIG. 4, the exemplary steps may begin with step 402 when the clock generator 200 in the GNSS receiver 102 may be powered down, thus disabling generation of the clock signal 209. In this regard, synchronous with an active edge of the reference signal 203, the LO enable signal 201 may be de-asserted and resetb 213 may be asserted. In this manner, the counter 216 may be reset to a known value. Subsequent to step 402, the exemplary steps may advance to step 404.

In step 404 the timer 112 may be clocked by the reference signal 203 to track time while the clock generator 200 is disabled. Subsequent to step 404, the exemplary steps may advance to step 406.

In step 406, power may be reapplied to the clock generator 200. In this regard, synchronous with an active edge of the reference signal 203, LO enable 205 may be re-asserted. Subsequent to step 406, the exemplary steps may advance to step 408.

In step 408, the PLL 204 may begin generating the LO signal 205. Accordingly, the timer 112 may count an additional 'Y' cycles of the reference signal 203 while the LO signal 205 stabilizes. After 'Y' cycles of the reference signal 203, resetb 213 may be de-asserted. In various other embodiments of the invention, the PLL 204 may generate a signal indicating when it is "locked". Subsequent to step 408, the exemplary steps may advance to step 410.

In step 410, synchronous with an active edge of the LO signal 205, the clock signal 209 may be toggled and generation of the clock signal 209 may begin. Subsequent to step 410, the exemplary steps may advance to step 412.

In step 412, with the presence of the clock signal 209, receiver time may be corrected to restore synchronization and/or a fixed relationship to (within a tolerance) satellite time. In this regard, the processor 108 may correct the receiver time utilizing, for example, EQ. 9 above.

Exemplary aspects of the invention of a method and system for clock synchronization in a GNSS receiver are provided. In this regard, generation of a clock signal 209 in a GNSS receiver 102 may be disabled during a first time interval, such as time 302 to time 306, and enabled during a second time interval, such as time 306 and later, wherein a counter 216 utilized to generate the clock signal may be initialized to a known value during the first time interval via a reset signal 213 synchronized to a reference signal 203. The reference signal 203 may be generated by a temperature compensated crystal oscillator. Additionally, a counter in the timer 212 may be incremented on each active edge of the reference signal 203 that occurs during the first time interval and the value stored in the timer 212 may be utilized to correct time in the GNSS receiver 102 after the first time interval. In this regard, the value stored in the timer 212 may be added to the time at which the first interval began. Power consumption of the GNSS receiver 102 may be reduced by powering down one or more portions of the GNSS receiver 102 during the first time interval, wherein the one or more portions may comprise the clock generator 200. In various embodiments of the invention, the clock generator the clock generator 200 utilized to generate the clock signal 209 may comprise a PLL 204 and a frequency divider 208. The PLL 204 may generate the LO signal 205 based on the reference signal 203 and the frequency divider 208 may divide the LO signal 205 to generate the clock signal 209. The frequency divider 208 may comprise a counter 216 which may be initialized to a known value when the reset signal 213 is asserted. The reset signal 213 may be asserted at time 302 on the active edge of the reference signal 203 that begins the first time interval. The reset signal 213 may be de-asserted at time 306 on an active edge of the reference signal 203 that corresponds to a transition between the first time interval and the second time interval.

Another embodiment of the invention may provide a machine-readable storage, having stored thereon, a computer program having at least one code section executable by a machine, thereby causing the machine to perform the steps as described herein for clock synchronization in a GNSS receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising: in a GNSS receiver, disabling generation of a clock signal during a first time interval and enabling generation of said clock signal during a second time interval, wherein:
a first counter utilized to generate said clock signal is initialized to a known value during said first time interval via a reset signal synchronized to a reference signal; and
said first counter is synchronized to said reference signal during said second time interval.

2. The method according to claim 1, wherein said reference signal is generated via a temperature compensated crystal oscillator in said GNSS receiver.

3. The method according to claim 1, comprising incrementing a second counter on each active edge of said reference signal that occurs during said first time interval.

4. The method according to claim 3, comprising utilizing a value stored in said second counter to correct time in said GNSS receiver subsequent to said first time interval.

5. The method according to claim 4, comprising adding at least said value stored in said second counter to the time at which said first time interval began.

6. The method according to claim 1, comprising reducing power consumption of said GNSS receiver by powering down one or more portions of said GNSS receiver during said first time interval.

7. The method according to claim 6, wherein said one or more portions of said GNSS receiver comprise, at least, a clock generator.

8. The method according to claim 7, wherein said clock generator comprises, at least, a phase locked loop and a frequency divider.

9. The method according to claim 8, wherein said phase locked loop generates a local oscillator signal based on said reference signal.

10. The method according to claim 9, wherein said frequency divider generates said clock signal based on said local oscillator signal.

11. The method according to claim 8, wherein said frequency divider comprises said first counter that is initialized to a known value when said reset signal is asserted.

12. The method according to claim 1, wherein said reset signal is asserted on an active edge of said reference signal that begins said first time interval and de-asserted on an active edge of said reference signal corresponding to a transition between said first time interval and said second time interval.

13. A system for signal processing, the system comprising: one or more circuits in a GNSS receiver, said one or more circuits operable to disable generation of a clock signal during a first time interval and enable generation of said clock signal during a second time interval, wherein:
a first counter utilized to generate said clock signal is initialized to a known value during said first time interval via a reset signal synchronized to a reference signal; and
said first counter is synchronized to said reference signal during said second time interval.

14. The system according to claim 13, wherein said reference signal is generated via a temperature compensated crystal oscillator in said GNSS receiver.

15. The system according to claim 13, wherein said one or more circuits comprise a second counter and said counter is incremented on each active edge of said reference signal that occurs during said first time interval.

16. The system according to claim 15, wherein said one or more circuits are operable to utilize a value stored in said counter to correct time in said GNSS receiver subsequent to said first time interval.

17. The system according to claim 16, wherein said one or more circuits are operable to add at least said value stored in said second counter to the time at which said first time interval began.

18. The system according to claim 13, wherein said reset signal is asserted on an active edge of said reference signal that begins said first time interval and de-asserted on an active edge of said reference signal corresponding to a transition between said first time interval and said second time interval.

19. A system for signal processing, the system comprising:

one or more circuits in a GNSS receiver, said one or more circuits operable to disable generation of a clock signal during a first time interval and enable generation of said clock signal during a second time interval, wherein:

a counter utilized to generate said clock signal is initialized to a known value during said first time interval via a reset signal synchronized to a reference signal; and said one or more circuits are operable to reduce power consumption of said GNSS receiver by powering down one or more portions of said GNSS receiver during said first time interval.

20. The system according to claim 19, wherein said one or more portions of said GNSS receiver comprise, at least, a clock generator.

21. The system according to claim 20, wherein said clock generator comprises, at least, a phase locked loop and a frequency divider.

22. The system according to claim 21, wherein said phase locked loop generates a local oscillator signal based on said reference signal.

23. The system according to claim 22, wherein said frequency divider generates said clock signal based on said local oscillator signal.

24. The system according to claim 21, wherein said frequency divider comprises said counter that is initialized to a known value when said reset signal is asserted.

\* \* \* \* \*